United States Patent
Thomson

(10) Patent No.: US 7,657,030 B1
(45) Date of Patent: Feb. 2, 2010

(54) METHOD FOR GENERATING AND DISTRIBUTING STRONG DES KEYS

(75) Inventor: Allen Brent Thomson, Reston, VA (US)

(73) Assignee: The United States of America, Washington, DC (US)

( * ) Notice: Subject to any disclaimer, the term of this patent is extended or adjusted under 35 U.S.C. 154(b) by 964 days.

(21) Appl. No.: 11/190,209

(22) Filed: Jul. 22, 2005

(51) Int. Cl.
*H04L 9/00* (2006.01)

(52) U.S. Cl. .......................................... 380/44; 380/29
(58) Field of Classification Search ................. None
See application file for complete search history.

(56) References Cited

U.S. PATENT DOCUMENTS

| | | | |
|---|---|---|---|
| 5,323,464 A | 6/1994 | Elander et al. | |
| 6,157,723 A | 12/2000 | Schultz | |
| 6,292,896 B1 | 9/2001 | Guski et al. | |
| 2003/0112970 A1 | 6/2003 | Mitra | |

OTHER PUBLICATIONS

Matyas et al., "Generation, distribution, and installation of cryptographic keys", IBM, 1978, Retrieved from the Internet on Jan. 17, 2009: <URL: http://www.research.ibm.com/journal/sj/172/ibmsj1702D.pdf>.*
Schneier, "Applied Cryptography", 1996, John Wiley & Sons, 2nd Edition, pp. 170-175, 278-285.*
"LineGuard 9000 Remote Port Manager—User's Guide", Western Datacom, Mar. 2004, Retrieved from the Internet on Jan. 17, 2009: <URL: http://www.western-data.com/documents/BETA%20LG9000%20Users%20Guide.pdf>.*

* cited by examiner

*Primary Examiner*—Minh Dinh
(74) *Attorney, Agent, or Firm*—Robert D. Morelli

(57) ABSTRACT

A method of generating a strong DES cryptographic key that doesn't require checking for parity or weak keys in the resulting key. First, all possible hexadecimal values are generated. Next, all possible two-hexadecimal value combinations are generated, where one of the two-hexadecimal values in a combination has odd parity, and the other even parity. Then, eliminate hexadecimal values E0, 01, F1, FE, 1F, 0E, 1E, and 0F from the list of all possible two-hexadecimal value combinations. Next, arrange each remaining two-hexadecimal value combination once in a user-definable order on a user-definable medium, such that the hexadecimal values alternate even and odd parity. Then, select eight unique two-hexadecimal value combinations on the user-definable medium in a user-definable manner. Lastly, use the selected eight two-hexadecimal value combinations as the DES cryptographic key.

7 Claims, 1 Drawing Sheet

METHOD FOR GENERATING AND DISTRIBUTING STRONG DES KEYS

FIELD OF INVENTION

The present invention relates, in general, to cryptography and, in particular, to key management.

BACKGROUND OF THE INVENTION

The Data Encryption Standard (DES) was established by the National Institute of Standards and Technology (NIST). DES is described in Federal Information Processing Standards (FIPS) Publication 46-3. DES is authorized for encrypting unclassified, but sensitive, U.S. Government information. DES may be, and has been, used in commercial cryptographic applications.

DES is an encoding, or cryptographic, algorithm which requires a cryptographic key that is 64 binary bits in length. A binary bit (hereinafter referred to as a bit) is a bit that may only take on one of two values, 0 or 1.

DES uses the same key for both encryption and decryption. Such a key is commonly referred to as a symmetric key. Each 64-bit DES key consists of 56 randomly generated bits and 8 parity bits.

A 64-bit DES key is partitioned into 8 8-bit segments. An 8-bit segment is commonly referred to as a byte. Each byte of a DES key consists of 7 randomly generated bits and 1 parity bit.

Parity is the function of making the total number of ones in a segment of bits either even or odd. If the parity bit makes the number of ones in a segment even then the parity of the segment is referred to as even parity. If the parity bit makes the number of ones in a segment odd then the parity of the segment is referred to as odd parity. DES requires odd parity. Therefore, to generate a DES key, 56 bits must be randomly generated, divided into 8 7-bit segments, and have an odd-parity bit generated for each of the 8 7-bit segments.

To insure that the content of an encrypted message is not revealed to an unintended person, the cryptographic key used to encrypt the message must not be known by the unintended person. The degree of difficulty of an unintended person to determine a cryptographic key that was not given to the person is a measure of the strength of the key. A strong key is not easily determined by one who is not given the key. A weak key is more easily determined by one who is not given the key. Weak keys result when the bits that are supposed to be random are either not random or exhibit a pattern that repeats. Each of these flaws reduces the amount of effort an unintended person must expend to determine the key.

In DES, a second encryption of a previously encrypted message, where the same key is used for both encryptions, should not result in the decryption of the encrypted message. In DES, subsequent encryptions should further encrypt the message. However, there are four keys for which a second encryption using the same key acts as decryption. Per FIPS Publication 74, paragraph 3.6, the four DES keys in hexadecimal (one hexadecimal bit represents 4 binary bits) are 0101010101010101; FEFEFEFEFEFEFEFE; E0E0E0E0E0E0E0E0; and 1F1F1F1F1F1F1F1F. In addition DES encryption should never perform the same function as DES decryption. However, FIPS Publication 74, paragraph 3.6, lists 12 DES keys for which there exists keys that can be used with DES encryption to mimic DES decryption. The 12 keys are E001E001F101F$_{101}$; FE1FFE1FFE0EFE0E; E01FE01FF$_{10}$EF10E; 01FE01FE01FE01FE; 011F011F010E010E; E0FEE0FEF1FEF1FE; 01E001E001F101F1; 1FFE1FFE0EFE0EFE; 1FE01EF10EF1; FE01FE01FE01FE01; 1F011F010E010E01; and FEE0FEE0FEF1FEF1. These sixteen keys should be avoided when using DES.

U.S. Pat. No. 5,323,464, entitled "COMMERCIAL DATA MASKING," discloses a device for and method of modifying DES keys in such a manner that would make the result exportable from the United States. DES was not exportable at the time U.S. Pat. No. 5,323,464 was filed. The present invention does not modify DES keys, as does U.S. Pat. No. 5,323,464. U.S. Pat. No. 5,323,464 is hereby incorporated by reference into the specification of the present invention.

U.S. Pat. No. 6,157,723, entitled "METHOD AND APPARATUS FOR SECURE COMMUNICATIONS WITH ENCRYPTION KEY SCHEDULING," discloses a device for and method of selecting cryptographic keys from a list of keys based on specific time periods. The present invention does not select cryptographic keys based on time periods, as does U.S. Pat. No. 6,157,723. U.S. Pat. No. 6,157,723 is hereby incorporated by reference into the specification of the present invention.

U.S. Pat. No. 6,292,896, entitled "METHOD AND APPARATUS FOR ENTITY AUTHENTICATION AND SESSION KEY GENERATION," discloses a device for and method of generating a cryptographic key using a shared secret with another party, time-dependent information shared with the other party, and a key weakening function. The present invention does not use time-dependent information or a key weakening function, as does U.S. Pat. No. 6,292,896. U.S. Pat. No. 6,292,896 is hereby incorporated by reference into the specification of the present invention.

U.S. Pat. Appl. No. 2003/0112970 A1, entitled "HOW TO GENERATE UNBREAKABLE KEY THROUGH ANY COMMUNICATION CHANNEL," discloses a device for and method of generating a cryptographic key by using a key exchange method with a double encrypted key. The present invention does not use a key-exchange method with a double encrypted key. U.S. Appl. Pat. No. 2003/0112970 is hereby incorporated by reference into the specification of the present invention.

SUMMARY OF THE INVENTION

It is an object of the present invention to generate strong DES cryptographic keys.

It is another object of the present invention to generate strong DES cryptographic keys in a manner that does not require a check for parity.

It is another object of the present invention to generate strong DES cryptographic keys in a manner that does not require a check for parity or weak keys.

The present invention is a method of generating strong DES cryptographic keys in a manner that does not require checking for parity or weak keys.

The first step of the method is generating all possible hexadecimal values.

The second step of the method is generating all possible combinations of two-hexadecimal values using the result of the first step, where one of the hexadecimal values in each combination has odd parity, and the other even parity.

The third step of the method is eliminating, from the result of the last step, two-hexadecimal value combinations E0, 01, F1, FE, 1F, 0E, 1E, and 0F.

The fourth step of the method is arranging each two-hexadecimal value combination remaining after the last step once in a user-definable order on a user-definable medium, such that the hexadecimal values alternate even and odd parity.

The fifth step of the method is selecting eight unique two-hexadecimal value combinations on the user-definable medium in a user-definable manner.

The sixth, and last, step of the method is using the result of the last step as the DES cryptographic key.

DETAILED DESCRIPTION

Figure 1:
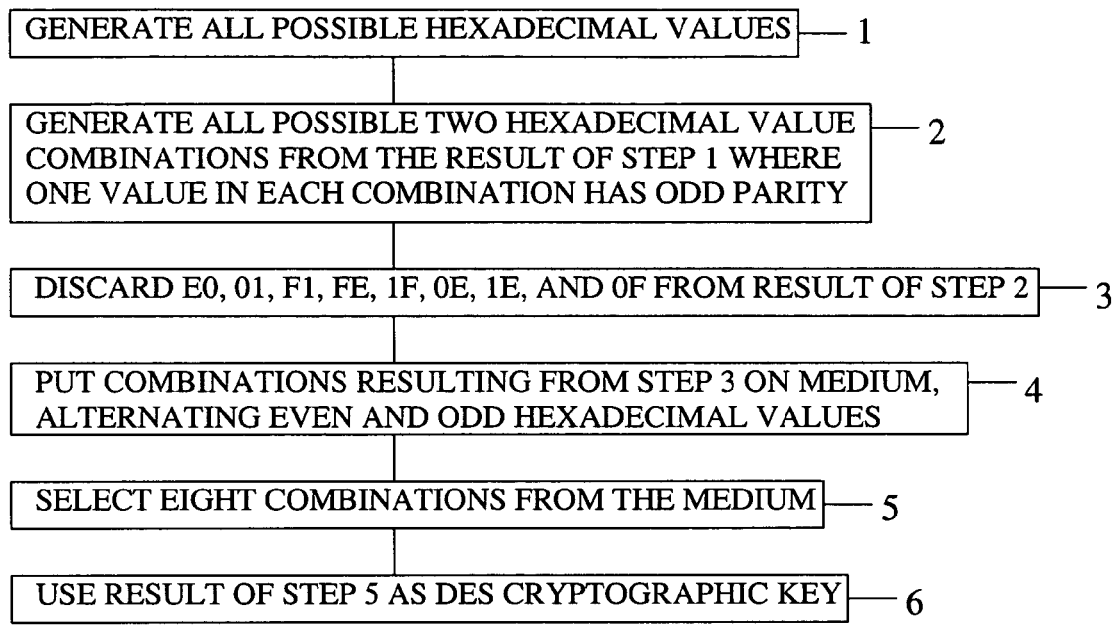
FIG. 1 is a flowchart of the steps of the present invention.

The present invention is a method of generating strong DES cryptographic keys without having to check the result for parity or for weak keys.

FIG. 1 is a flowchart of the method of the present invention.

The first step 1 of the method is generating all possible hexadecimal values (i.e., 00 through FF).

The second step 2 of the method is generating all possible combinations of two hexadecimal values using the result of the first step 1, where one of the hexadecimal values in each combination has odd parity, and the other even parity. A combination of two hexadecimal values, where one has odd parity and the other even, is guaranteed to exhibit odd parity, as required by DES. Therefore, a DES key generated by the present invention need not be checked for odd parity because the method used to generate the key guarantees that it will exhibit odd parity. There are 128 possible combinations of two hexadecimal values.

The third step 3 of the method is eliminating, from the result of the second step 2, two-hexadecimal value combinations E0, 01, F1, FE, 1F, 0E, 1E, and 0F. These eight two-hexadecimal value combinations are responsible for the generation of all of the possible weak DES keys. By eliminating them from the pool of selectable two-hexadecimal value combinations for use in a DES key, only strong DES key will be generated, eliminating the need to check the resulting key for weak keys.

The fourth step 4 of the method is arranging each two-hexadecimal value combination remaining after the third step 3 once in a user-definable order on a user-definable medium, such that the hexadecimal values alternate even and odd parity. Since repeating values in a DES key weakens the key, arranging each two-hexadecimal value combination only once eliminates the possibility that two unique selections of two-hexadecimal value combinations will result in a repeat of a two-hexadecimal value combination. The medium on which the remaining two-hexadecimal value combinations are arranged includes a wheel, a table, and a linear string. Each medium allows for the treatment of the two-hexadecimal value combinations arranged thereon to be treated as contiguous data, where the data point after the last data point on the medium is the first data point on the medium.

The fifth step 5 of the method is selecting eight unique two-hexadecimal value combinations on the user-definable medium in a user-definable manner. The total number of hexadecimal values selected in the fifth step 5 is 16. Since a hexadecimal value consists of 4 bits, the total number of bits selected in the fifth step 5 is 64, as required by DES. The user-definable manner includes selecting eight unique two-hexadecimal value combinations in eight groups, where each group consists of one two-hexadecimal value combination (i.e., 8 contiguous bits). The user-definable manner also includes selecting eight unique two-hexadecimal value combinations in four groups, where each group consists of two contiguous two-hexadecimal value combinations (i.e., 4 contiguous hexadecimal values or 16 contiguous bits). The user-definable manner further includes selecting eight unique two-hexadecimal value combinations in two groups, where each group consists of four contiguous two-hexadecimal value combinations (i.e., 8 contiguous hexadecimal values or 32 contiguous bits). The user-definable manner lastly includes selecting eight unique two-hexadecimal value combinations in one group, where the group consists of eight contiguous two-hexadecimal value combinations (i.e., 16 contiguous hexadecimal values or 64 contiguous bits). The smaller the number of contiguous hexadecimal values selected the larger the number of possible selection combinations. When selections are made in groups of two contiguous hexadecimal values, there are $4.3 \times 10^{16}$ different keys that can result. For 4 contiguous hexadecimal values selected as a group, there are $2 \times 10^8$ possible keys. For 8 contiguous hexadecimal values selected as a group, there are 14,400 possible keys. For 16 contiguous hexadecimal values selected as a group, there are only 120 possible keys.

The sixth, and last, step 6 of the method is using the result of the last step as the DES cryptographic key.

Distribution of keys generated by the present method is straight forward. If two parties each have a medium (e.g., a wheel) on which is arranged the same two-hexadecimal value combinations in the same order, where the medium includes a user-definable indicator to indicate which two-hexadecimal value combination is considered the first two-hexadecimal value, key agreement between the parties can be easily accomplished by merely transmitting the size of the group to be selected and the position of each group to be selected. For selecting groups of two-hexadecimal value combinations, 8 positions must be transmitted. For selecting groups of two contiguous two-hexadecimal value combinations, 4 positions must be transmitted. For selecting groups of four contiguous two-hexadecimal value combinations, 2 positions must be transmitted. For selecting groups of eight contiguous two-hexadecimal value combinations, only one position need be transmitted.

What is claimed is:

1. A method of generating a strong DES cryptographic key on a computing device, comprising the steps of:
    a) generating all possible hexadecimal values on the computing device;
    b) generating all possible combinations of two hexadecimal values on the computing device using the result of step (a), where one of the hexadecimal values in each two-hexadecimal value combination has odd parity;
    c) eliminating on the computing device, from the result of step (b), two hexadecimal value combinations E0, 01, F1, FE, 1F, 0B, 1E, and 0F;
    d) arranging on the computing device each two-hexadecimal value combination remaining after step (c) once in a user-definable order on a user-definable medium, alternating even and odd hexadecimal values;
    e) selecting on the computing device eight unique two-hexadecimal value combinations on the user-definable medium in a user-definable manner; and
    f) using on the computing device the result of step (e) as the DES cryptographic key.

2. The method of claim 1, wherein said step of arranging on the computing device each two-hexadecimal value combination remaining after step (c) once in a user-definable order on a user-definable medium is comprised of the step of arranging on the computing device each two-hexadecimal value combination remaining after step (c) once in a user-definable order on a wheel.

3. The method of claim 1, wherein said step of arranging on the computing device each two-hexadecimal value combination remaining after step (c) once in a user-definable order on a user-definable medium is comprised of the step of arranging on the computing device each two-hexadecimal value combination remaining after step (c) once in a user-definable order in a table.

4. The method of claim 1, wherein said step of arranging on the computing device each two-hexadecimal value combination remaining after step (c) once in a user-definable order on a user-definable medium is comprised of the step of arranging on the computing device each two-hexadecimal value combination remaining after step (c) once in a user-definable order in a string.

5. The method of claim 1, wherein said step of selecting on the computing device eight unique two-hexadecimal value combinations on the user-definable medium in a user-definable manner is comprised of the step of selecting on the computing device eight unique two-hexadecimal value combinations on the user-definable medium in groups of two contiguous two-hexadecimal value combinations.

6. The method of claim 1, wherein said step of selecting on the computing device eight unique two-hexadecimal value combinations on the user-definable medium in a user-definable manner is comprised of the step of selecting on the computing device eight unique two-hexadecimal value combinations on the user-definable medium in groups of four contiguous two-hexadecimal value combinations.

7. The method of claim 1, wherein said step of selecting on the computing device eight unique two-hexadecimal value combinations on the user-definable medium in a user-definable manner is comprised of the step of selecting on the computing device eight unique two-hexadecimal value combinations on the user-definable medium in groups of eight contiguous two-hexadecimal value combinations.

\* \* \* \* \*